UNITED STATES PATENT OFFICE.

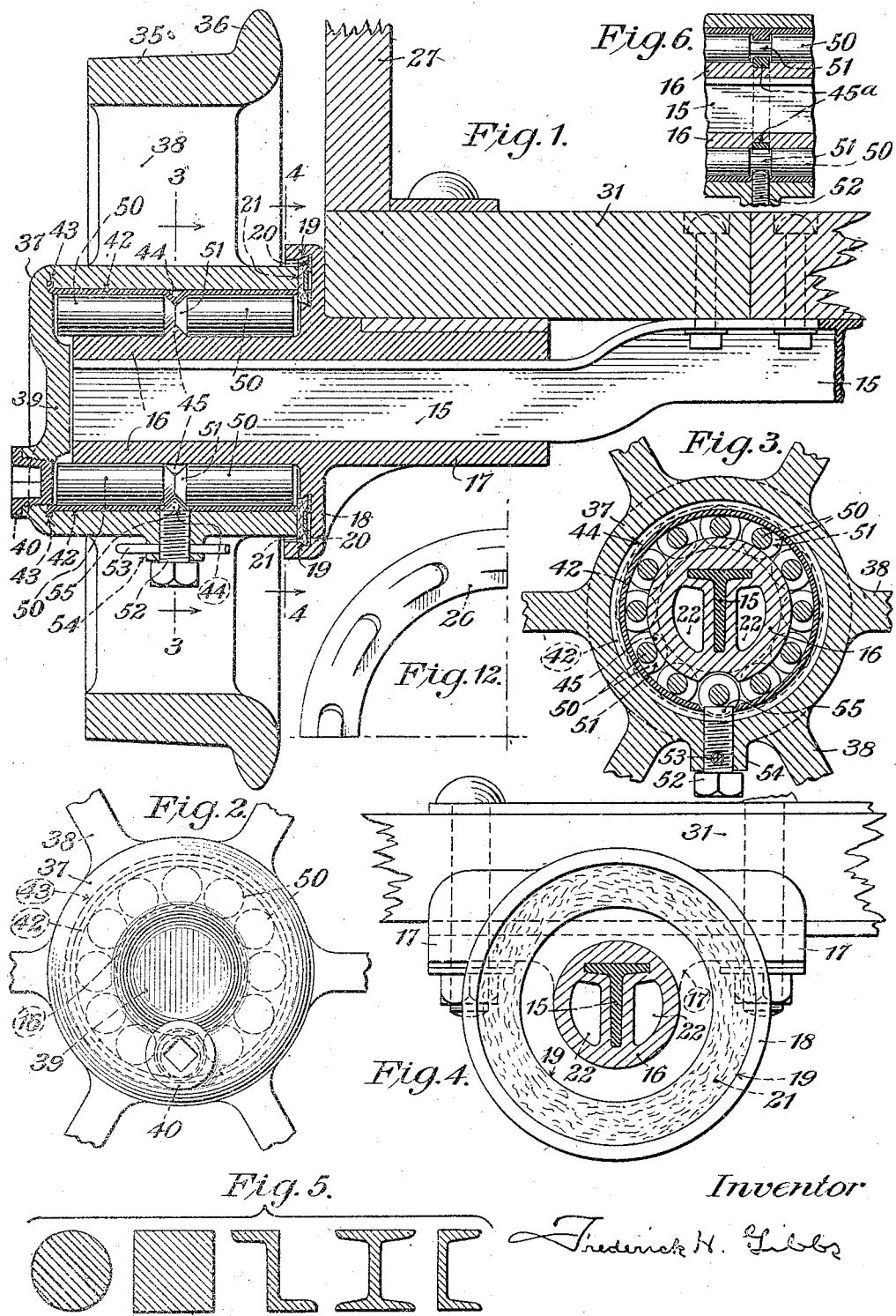

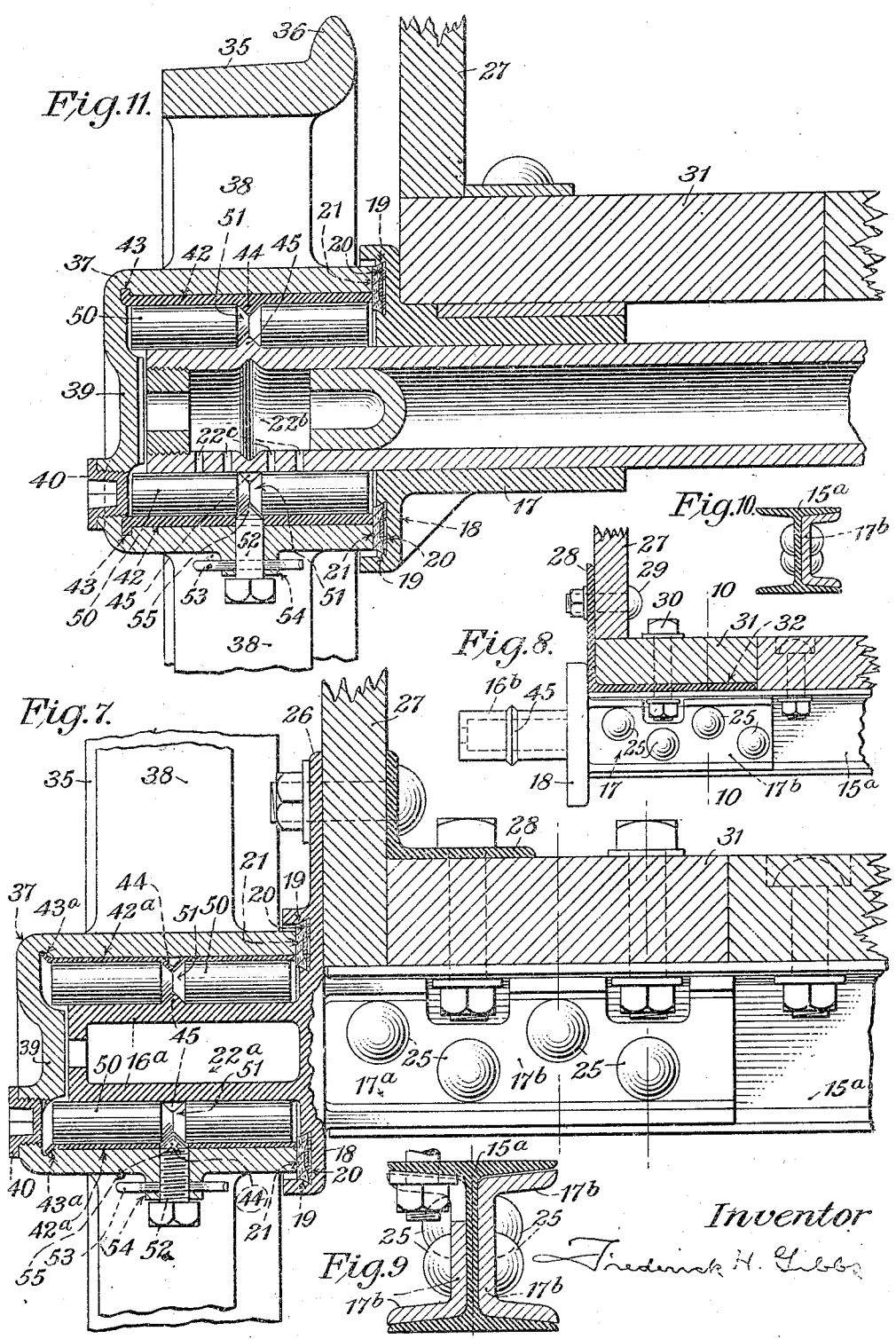

FREDERICK H. GIBBS, OF BROOKLYN, NEW YORK, ASSIGNOR TO AMERICAN CAR AND FOUNDRY COMPANY, OF NEW YORK, N. Y., A CORPORATION OF NEW JERSEY.

ROLLER-BEARING WHEEL AND MEANS FOR ATTACHING SAME TO AXLE.

1,256,483.          Specification of Letters Patent.          Patented Feb. 12, 1918.

Application filed October 30, 1916. Serial No. 128,456.

*To all whom it may concern:*

Be it known that I, FREDERICK H. GIBBS, residing at borough of Brooklyn, county of Kings, city and State of New York, and being a citizen of the United States, have invented certain new and useful Improvements in Roller-Bearing Wheels and Means for Attaching Same to Axles, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a longitudinal vertical sectional view taken through a wheel, an axle and a fragment of a car body;

Fig. 2 is an end elevational view of the hub of the wheel;

Fig. 3 is a vertical sectional view, the section being taken on line 3—3 of Fig. 1;

Fig. 4 is a similar view, the section being taken on line 4—4 of Fig. 1;

Fig. 5 is a view illustrating in section various commercially rolled sections of metal hereinafter referred to;

Fig. 6 is a fragmentary detail of a modification shown in section;

Fig. 7 is a view similiar to Fig. 1, illustrating a modified type of axle;

Fig. 8 is a similar view of a further modification;

Fig. 9 is a composite sectional view, the half-section on the left being taken on line 9—9 of Fig. 7, and that on the right being taken on line 9ᵃ—9ᵃ of said figure;

Fig. 10 is a sectional view, the section being taken on line 10—10 of Fig. 8;

Fig. 11 is a central longitudinal sectional view showing the invention applied to a tubular axle; and Fig. 12 is a fragmentary elevational view of a pressure ring hereinafter described.

The object of the invention is to simplify the construction of roller bearing wheels and axles, and the means of attaching said wheels to their axles, for use especially in mine cars, though it is evident that many of the combinations of elements herein described and illustrated in the drawings, are capable of use in other structures, including vehicles of various types, as well as in shop practice, and it is my intention to claim the same broadly, regardless of the specific use to which such combinations may be put.

Referring specifically to the invention as applied to mine cars, it may be well to call attention to the fact that manufacture of such cars are not always able to obtain, in the open market, rolled steel axles of a size which are ordinarily required for the small cars used in coal and other mines, in consequence of which deliveries to customers are frequently delayed.

Economy of manufacture and simplicity in the combination of the components are among the objects of the invention.

Another object of the invention is to relieve the assembly of all frail parts which are likely to become damaged or broken and require renewal in service, thereby producing a complete structure in which the ruggedness of the parts contributes materially to durability and continued service.

Referring specifically first to the axle construction of Figs. 1 to 10 inclusive, the middle portion of the axle, that is the portion intermediate the pedestals or journal boxes, hereinafter referred to, is preferably composed of a rolled commercial section which may be, as shown in Fig. 1, a T-section, 15; as shown in Figs. 7 to 10, an H-section. All this portion of the axle may be formed from any of the sections illustrated in Fig. 5, though preferably the section used should have one or more flat faces.

As a cylindrical spindle is desirable to enter the wheel hub, this is formed in various ways, as follows:

In the construction illustrated in Figs. 1 to 4 inclusive, the wheel spindle 16 and the pedestal 17 are cast as an integer and preferably cast upon the outer end portion of the axle section 15, though it is evident that the spindle and pedestal may be separately formed and attached by rivet connection, or any other means (not shown) to the outer end portions of the rolled section 15.

Cast integrally with the spindle and pedestal, are flanges 18 which preferably are recessed at 19 to receive within them the pressure ring 20 and the felt packing 21 which retain the lubricant in the wheel, and it is to be noted that the metal forming the spindle 16 is cored out at 22, see Fig. 3, to provide a storage receptacle for said lubricant within the wheel hub.

Fig. 7 illustrates a modified form of axle in which the middle portion 15ª is in the form of a commercially rolled H-section, to the outer end portions of which, at each end, are secured the combined wheel spindles 16ª and pedestals 17ª, though, in this instance, the wheel spindle 16ª is composed preferably of a steel casting cored out as at 22ª to form a lubricant chamber and extending rearwardly in the form of bifurcated arms 17ᵇ which are securely riveted to the H-section, 15ª, by rivets 25 passing through the bifurcated arms 17ᵇ and the web of said H-section 15ª.

A modification of this general design is shown in Figs. 8 and 10, in which the spindle 16ᵇ is provided with but one rearwardly extending arm 17ᵇ which is connected to the web of the H-section 15ª by rivet connection. The principal distinguishing difference between the constructions of Figs. 7 and 9 and 8 and 10 is that in the former the pedestal is provided with an upwardly extending flange 26, to which is directly bolted a side wall 27 of the car body, while in Figs. 8 and 10, this flange is omitted and the angle 28 rests directly upon the upper flanges of the rolled section 15ª and bolts 29 extend through the vertical leg of said angle to connect to it the side wall 27, while bolts 30 pass through the floor 31, the horizontal leg 32 of said angle, and an outstanding upper flange of said rolled section 15ª.

Broadly stated, the distinguishing difference between the end portions of the axle construction shown in Figs. 1 to 4 and that shown in Figs. 7 to 10 inclusive, is that in the first form the end portion of the axle is a composite structure comprising a rolled section and a casting, whereas, in the other figures, the end portions of the axle are of cast metal, preferably of cast steel.

The use of either of these constructions obviates the necessity of using rolled steel axles and permits the utilization of such commercial shapes as are readily obtainable in the open market, together with castings which under normal conditions may be secured upon short notice.

In the construction shown in Fig. 11, the axle illustrated is in some respects similar to that shown in Peckham Patent No. 302864, of July 29, 1884, modified, however, to adapt it to the present invention which includes means for securing a roller bearing wheel upon said axle.

The Peckham axle was of uniform diameter from end to end and contemplated no means within the length of the axle proper for securing to it any type of wheel.

In this figure the tubular axle is continuous from end to end and is reinforced within the zone of compression within the wheel and includes a lubricant reservoir 22ᵇ from which lubricant may be fed through the openings 22ᶜ to the rollers hereinafter described. The axle illustrated includes means for securing the wheel thereto, something not contemplated by Peckham.

Referring now to the wheel casting, it will be noted that it is, in many respects, similar to mine car wheels as commonly used, in that it is provided with a tread 35 and flange 36, a hub portion 37 and spokes 38, the outer end of the hub being preferably closed, as shown at 39, though it is evident that the closed hub is not essential to the invention and any type of axle end and any type of either open or closed hub may be employed, as disclosed in the prior art.

In the type of wheel illustrated with the closed hub, however, it is essential that means be provided to permit insertion of the rollers and to that end an opening is provided through the outer wall of the hub, which opening is, in the present instance, closed by means of the screw-threaded plug 40, and it is to be noted that this opening should be large enough to permit insertion therethrough of the largest bearing roller which it is intended shall be used in the roller bearing assembly hereinafter described and to secure the plug in position it, as well as the opening in which it is received, is screw-threaded, in addition to which any other suitable means may be employed, if desired, to lock said plug in position.

As cast metal, such as is used in mine car wheels, usually comes from the molds with a surface which is somewhat rough, it has been common practice to bore out these hubs and insert therein a lining against which the rollers may bear.

There is no serious objection to this method of assembly, but to expedite the manufacture of the wheel I prefer to form this lining separately and cast in position, thereby providing in the wheel, as it comes from the mold, a suitable bearing within the wheel for the rollers.

To that end, the lining 42, best shown in Fig. 11, is provided with an outstanding flange 43 which, as will be evident, locks the lining in position when the metal forming the wheel hub is cast about it.

This lining is provided intermediate its inner and outer ends with a circumferential inwardly projecting annulus 44, which may be of any suitable contour, and in alinement therewith, when the wheel and axle are properly assembled, a similar outstanding circumferential annulus 45 is provided on the axle in that portion thereof which rests within the wheel hub.

The annuli 44 and 45 may be provided in any suitable manner, as for example, as illustrated in Fig. 11, in which it is part of a casting forming the lining of the wheel hub and a part of the axle swaged outwardly or, as shown in the other figures, in which the lining may be of thinner metal within the wheel hub and the axle be cast with a spindle portion provided with an annulus corresponding with the annulus 45 of Fig. 11.

As best illustrated in Fig. 3, the annuli 44 and 45 are intermitted to facilitate introduction of the bearing rollers between the axle and the wheel hub, and it is to be noted that the rollers 50 are provided, intermediate their ends, with annular grooves 51 adapted to be brought into coincidence with the annuli 44 and 45 when the parts are assembled, and, due to the interfitting and interlocking of said parts, the rollers are held in position upon the axle and through said rollers the wheel is also locked in operative position upon said axle.

Though it is not absolutely necessary to do so, means are provided for assisting the annulus 44 to retain the rollers in position, said means comprising the insertible plug 52, illustrated in Fig. 11, which is held in position by the cotter pin 53 projected through suitable orifices in the outstanding lug 54 on the wheel hub and in the plug 52, thereby locking said plug removably in position.

It may be desirable to screw-thread the plug, and in Figs. 1 and 3 the plug is shown screw-threaded, and, in whatever form used, it is preferred that the inner end 55 of the plug be wedge-shaped so as to practically complete the outer annulus 44.

In the modification illustrated in Fig. 6, the annulus 45$^a$ comprises a ring shrunken into a circumferential groove in the wheel spindle 16.

Instead of casting the cylinder or lining 42 in position, it may be inserted after the wheel hub is cast and bored and the outer end portion 43$^a$ may be distorted radially, as shown in Fig. 7, to form a locking flange to hold said lining 42$^a$ in position.

When the wheel is to be attached to the axle, the intermitted portions of the annuli 44 and 45 should be uppermost and the rollers inserted one at a time through the space provided thereby, after which the plugs 40 and 52 may be inserted.

When it is desired to disassemble the wheel and axle, the position of the parts should be reversed with the intermitted portions of the annuli 44 and 45 at the bottom, that is, in the position normally occupied when the composite structure is in operation.

comprising separately formed parts in its lower portion, an axle formed in part of a rolled section and in part of cast spindles lapping said rolled section, and means penetrating and co-acting with said axle and said separately formed body parts whereby said parts and axle are maintained properly positioned by each other.

2. In combination in a mine car, a body portion having floor-forming sections, an axle formed in part of a floor stiffener of rolled section and in part of cast spindles lapping said rolled sections, and means rigidly interlocking the lapping portion of said spindle and rolled section with some of said floor sections, different means interlocking other floor sections with said rolled section, and wheels interlocked with said spindles.

3. In combination in a mine car, a body portion, an axle comprising a middle portion formed of a rolled commercial section secured to said body portion, cast pedestals fitting said rolled commercial section and spindles cast integral with said pedestals.

4. In a car, a body, an axle terminating in wheel-spindles having wheel-receiving portions with intermediate annular ribs adapted to interlock with means internally combined with wheel-hubs, said axle being provided with an intermediate portion formed from a commercially rolled metal section adapted to be connected directly to said body.

5. In combination, an axle terminating in spindles, reinforcements extending longitudinally within such spindles, wheels adapted to house the outer ends of said spindles and rollers interlocking with the wheels and spindles to secure the wheels thereon and to hold portions of said wheels opposed to the ends of said reinforcements.

6. In combination, an axle comprising spindles of cast metal having portions adapted to project into wheel hubs and a commercially rolled member having end portions extending with constantly uniform cross sectional area through the portions of said spindles that are adapted to enter wheel hubs, said rolled member also forming the intermediate portion of the axle.

7. As an article of manufacture, an axle comprising a commercially-rolled middle portion having flanges adapted to be connected to a car body and having cast metal wheel-spindles with wheel-receiving portions annularly ribbed intermediate the terminals of said portions, said spindles forming end portions lapping said commercially rolled middle portion.

8. In combination in a car, an axle having a portion thereof formed from a rolled section and wheel spindles cast upon and having portions containing lubricant pockets surrounding end portions of said rolled section.

from a commercially rolled section bent upwardly at its middle portion and having pedestal boxes provided with car body seats and wheel spindles cast upon its end portions.

10. In combination in a car, an axle formed from a flanged section of metal with wheel spindles of cast metal entirely surrounding end portions thereof having uniform cross section.

11. In combination, a T-section forming an axle with wheel spindles of cast metal entirely surrounding end portions thereof, said spindles having wheel-receiving portions comprising in cross section outer annular portions merging with portions fitted to and embracing the end portions of said T-section.

In witness whereof I have hereunto set my hand in the presence of two witnesses.

FREDERICK H. GIBBS.

Witnesses:
  EDW. D. HILLMAN,
  FLORA M. CURTIS.